6015X
J. Stimpson,
Railroad,
Patented June 3, 1830.
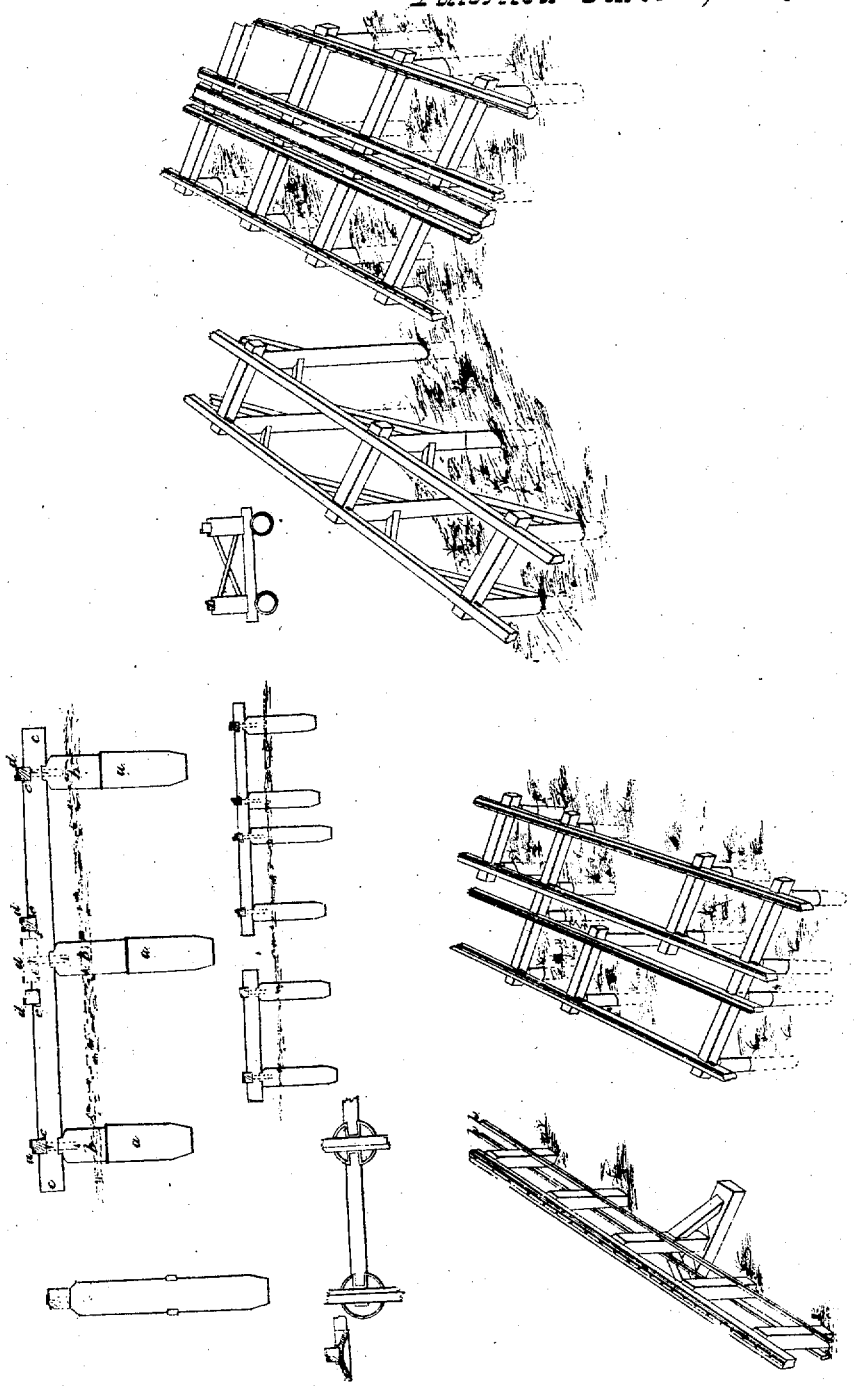

James Stimpson Baltimore Maryland

Letters-Patent

The Schedule referred to in these Letters Patent and making part of the same containing a description in the words of the said James Stimpson himself of his improvement in the mode of constructing timber Rail Roads To all to whom these presents shall come. Be it known that I James Stimpson of the City and County of Baltimore and State of Maryland have invented a new and useful improvement in the mode of constructing tim ber Rail Roads. and that the following is a full and exact description of the construction as invented and improved by me. I propose to make Roads of one. two. three or four Rails or more, as may be desired. said rails to be secured in notches cut down into timbers laid transversely with them at a distance from four to ten feet more or less apart. said timbers to rest upon wood piles. posts. stone blocks. cast iron chairs respectively alternately as the nature of the earth may require in as many rows as there are track rails except in one variation which will be hereafter mentioned. When a Road is made to consist of but one rail for the carriage to run upon it should be considerably elevated above the ground to admit of the carriage being suspended on each side. and sufficiently below the top of the rail to bring the centre of gravity of the load and carriage below the top of it. There should also be another line of rails below the top rail fastened to the outsides of the posts. the outsides of the rails being flat and straight and so confined to the posts as to produce the same distance through horizontally from out to out the whole length of the road for side or guide wheels to run against which will keep the carriage in an upright position although it may be loaded out of balance. The posts of which track may be driven or sunk into the earth or set upon it having a sufficient number in the earth and to a proper depth to secure its upright position. or the posts may be stepped upon transverse sleepers especially where the line of elevation of the rail is considerably above the earth. but said posts must have braces on each side ranging from near the ends of the transverse sleepers up to the Portfolio.

~~8835X~~
LC15X posts intersecting them at the same line of elevation but sufficiently below the
rails not to interfere with the carriage or any other post more or less may be
driven into the earth or rest upon said shelving. 2nd When two rows of posts
stone blocks cast iron chairs or pedestals are used for a two rail or single
track they are to be surmounted by the transverse timbers. secured to the
posts stone blocks or pedestals as will be hereinafter mentioned. said tim
bers are to have notches cut down into them sufficiently deep and wide
to bed securely the road rails into by help of pins keys or otherwise.
2 When three rails are laid upon three rows of posts &c. the middle rail should
be so wide as to allow the wheels of the cars to pass each other without touch
ing and sunk into transverse timbers as before described centrally over
the posts stone blocks &c. the said three rails may be so distant as to leave the
usual width of Road tracks including the vacant space between them with only
the inconvenience of the extension of the length of the wheel axles. Four rails
may be laid upon the above transverse timbers the notches being cut equidistant
from the middle row of posts three or four feet apart more or less. 3 but if four
Rails be laid upon four rows of posts stone blocks cast iron chairs or pedes
tals they should be laid centrally over them but in that case a part of the
transverse timbers may not extend through both tracks, but every other or
second one. said road rails should be surmounted by cast or wrought iron
plates for the wheels to run upon. but to avoid the expense of iron plates I
propose in some cases on lateral roads especially to make roads with wide tim
ber Rails. the carriage wheels corresponding in width and tired with thin
iron and may have a double row of spokes to support the fellows. by which
increase of width they will not sink into the wood of the rails so as to obstruct
their passage. In some cases I suppose to drive down a short lower post
sufficiently below the surface to obtain a solid foundation and to secure it
from decay then to step the top post reaching to the road rails upon that. for
the reason that when the bottom of the top post has decayed where it comes in
contact with the earth so as to require its removal it can easily be done and the
bottom one still remain to support a new one. By this procedure also the
exact and necessary length of the upper post can be ascertained and adjusted
before it is put into its place and with more economy of stone &c. I propose

~~8833X~~ 600154X to make cast iron chairs or pedestals circular or any other shape twelve to eigh
teen inches diameter more or less crowning upwards in the centre about three
inches more or less. with a thin rim projecting upwards about one inch
wide with thin ribs ranging from near the centre out to the rim with two
staits or studs three inches more or less in length and about the same in
hight. parallel to each other and equidistant from the centre. and at a prop
er distance apart to receive the road rails. through which staits and rail
a pin may be driven to confine them together and upon the inside of the outside
chairs is to be cast directly against the inside rail stait or stud. two other
staits at right angles with the first mentioned stait nearly converging from
the rail stait at which place they both join half an inch at their outer ends
which last mentioned staits are to receive dovetailed tenons of the transverse
timbers which timbers are to reach from one chair to the other transversely
of the road and to confine the chairs in their proper places and to prevent
their being rendered by lateral pressure. they may also be notched
down upon the rim for further security. The middle chairs must have
staits on both sides of the middle or Road Rail staits to receive the ends of
the transverse timbers of the two tracks. the base of which iron chair
may not exceed one eighth of an inch in thickness between the ribs it
being convex and strengthened by the thin ribs at proper distances. and
also by the staits which confine the rails. or the transverse timbers may
be laid down upon the cast iron chairs between the two first mentioned
staits, and then the track rails upon them in notches, as in other cases.
and then the dovetail staits may be left off the chair when used in this
way. These chairs or pedestals may be extended perpendicularly to any
satisfactory hight. by raising a column consisting of plates about half an
inch thick. four inches wide more or less. and crossing each other at right
angles through the centre where they join. being cast in this form. they
would probably afford the most strength for the same weight of metal: with
a pin in the centre upon the top to pass up through the transverse timbers
and into the road rails. which pedestals in this form would enable us to pass
slight hollows in the earth without embankments. as in general I propose
these roads for Locomotive Carriages where no path is necessary. In using cast

~~8833X~~
L0015X ings of the last description. the stalls may all be left off. or the columns may
be of any other form. All the above mentioned chairs or pedestals. I propose
to use chiefly in sand ridges where stone cannot be well procured in hot
climates where wood posts or piles would be subject to rapid decay and where
the elevation of the road and earth will permit. When using stone blocks to
support the transverse timbers. holes should be made into them to receive
pins which confine the transverse timbers upon them. Or blocks of stone may
be placed at the ends of said timbers, on to, or into the earth to prevent any
lateral movement of said timbers. The joinings of all the posts transverse
timbers and track rails where they come in contact with each other are
to be secured by pins. keys. or other means in the following manner and
form. The tops of the posts are to be made true horizontally a little rounding
upwards in the centre and all reduced to a certain size at top for an
inch or more down leaving the edge of the shoulder should there be any
in reducing the posts a little sloping downwards from the posts out to shed
water. a hole is to be made in the tops and centres of said posts to receive
a pin of sufficient size to confine the transverse timbers and track rails
to them. The transverse timbers are to have holes bored through the
centres of the notches made for the track rails to bed in. of a size conformable
to those in the tops of the posts. the under sides of which timbers should
be cut out a little concave. and sufficiently distant from the hole in
the centre to fit on the tops of the posts. by which means and shape no
water can insinuate itself into the joinings or on to the tops of the posts. I
purpose to bore holes into the under sides of the track rails nearly but not
quite through and after the transverse timbers are adjusted to the tops of
the posts a pin is to be driven into the holes made in the transverse timbers
and tops of the posts. firm on to the bottom leaving a sufficient
length above to fill the holes in the under sides of the track rails. which
rails are to be driven down upon said pins and into the notches
cut down into the transverse timbers for that purpose and keys may
also be driven between the rails and the sides of the notches for a further
security. said pins not reaching up through the rail will prevent
water from descending into the posts &c. or the pins may be left just flush with the sole of the notch under the rails and have a wedge or wedges
driven into it if necessary and then the rails fastened to the crop bearers
or transverse timbers by keys or other means. What I claim as my
invention or improvement in the construction of timber Rail Roads, is the
elevation above the ground of the road rails and the timbers transversely
to them throughout the whole length of the road, and their mode of
combination as set forth in the specification: they requiring but a slight
support from the earth to keep them in an upright position, by means of
the crop timbers being strongly confined to the road rails posts &c. combi-
ned with the firm foundation of the road posts effected by the secunda-
ry posts which are driven into the earth. small stones under the stone
blocks, or [into the] cast iron chairs either kind to be used alternately. when
the elevation of the road or the nature of the earth may require it. Also
the right of driving or sinking separate posts or piles from those connected
to the crop timbers whereby I obtain a firm foundation and its security
from decay by their being sunk sufficiently below the surface for that pur-
pose. Also the right to set posts upon the ground and sink them alter-
nately. or to step them upon crop timbers with braces or upon stone blocks
or cast iron chairs and to drive them deep alternately for the necessary
firmness against lateral pressure. Also the three rail track upon three
rows of posts. cast iron chairs and stone blocks alternately as may be requi-
red by the nature of the earth &c. Also the four rail track upon three rows
of posts &c. Also the right of extending the crop timbers alternately through
the tracks or not. to save timber as may be found best in the four rail track
with four rows of posts &c. Also the under sills for the one rail track
with the manner of setting the posts upon pile foundation below the sur
face and upon crop sills with braces stones or iron chairs alternately.
Also reducing the tops of the posts to one size and cutting the tops accurately
& also the shaping of the undersides of the transverse timbers to conform
to the tops of the posts. Also the cast iron chair or pedestal secured upon
small stones, or solid rammed or pounded earth for a substitute for
wood posts, or stone blocks: whereby the crop timbers and road rails have
a support without touching the earth. Also the right of [illegible] timber

~~5833X~~
6015X rails to serve new. Also the right of stepping the road posts upon cross timbers and they to rest upon logs lying upon the ground lengthwise of the road secured by braces at different parts of it. Also the extension of posts to an unusual distance from each other by the application of braces &c also the wedges in the pins as set forth. Also the two rail track as set forth in the specification.

Witnesses
Julia Stimpson
J. Neilson

James Stimpson

Ent.
M.G.C.

Patented June 3 1831

[2352 words